Oct. 16, 1951  E. L. ALDINGER, JR  2,571,808
COMBINATION FISHING LINE AND BOBBER
Filed June 27, 1950

INVENTOR.
EDWARD L. ALDINGER, Jr.
BY
*J. Warren Kinney, Jr.*
ATTORNEY

Patented Oct. 16, 1951

2,571,808

UNITED STATES PATENT OFFICE 2,571,808

COMBINATION FISHING LINE AND BOBBER

Edward L. Aldinger, Jr., Cincinnati, Ohio

Application June 27, 1950, Serial No. 170,514

3 Claims. (Cl. 43—44.91)

This invention relates to fishing equipment, and more particularly to a combination fishing line and bobber.

An object of the invention is to provide a fishing line or leader with a plurality of spaced tapered abutment members, the relative sizes of which increase in a definite or predetermined ratio.

Another object of the invention is to provide a fishing bobber for use with such a line wherein the bobber is provided with means for enabling the user thereof to selectively alter the effective diameter of the axial, line-receptive bore therethrough for enabling the user to accurately predetermine the depth of submersion of a fishing hook secured to the free outer end of the fishing line.

A further object of the invention is to provide a fishing bobber, the opposite ends of which are each provided with means for selectively altering the effective diameter of the bore therethrough, thereby enabling the bobber to be utilized in either of two normal positions.

Still a further object of the invention is to provide a fishing bobber having adjustable means for selectively altering the effective diameter of its axial bore and which includes means for precluding accidental or unintentional change in the effective diameter of said axial bore incident to normal use and handling of the bobber.

Another object of the invention is to provide a fishing line and bobber assembly which is so constructed and arranged as to permit the fishing line to be wound upon a conventional fishing reel for elevating the bobber up to the free outer end of the fishing rod, thereby enabling the user of the device to cast with great accuracy.

Still a further object of the invention is to provide a fishing bobber having the hereinabove described characteristics which may be manufactured using modern mass-production methods and which will give many years of trouble-free service.

These and other objects are attained by the means described herein and as disclosed in the accompanying drawings in which.

Figure 1:
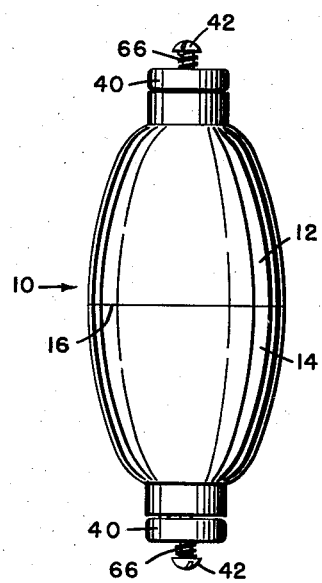
Fig. 1 is a plan view of a fishing bobber made in accordance with the teachings of the present invention.
Figure 2:
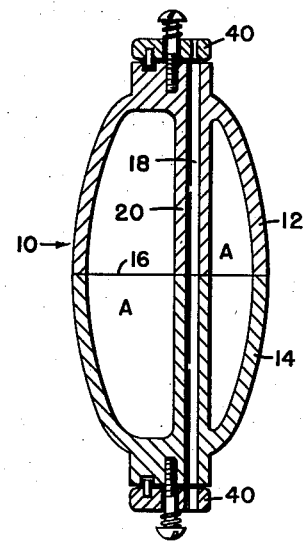
Fig. 2 is a vertical sectional view of the device of Fig. 1.

With reference to Figs. 1 and 2, the numeral 10 denotes generally a fishing bobber comprising complementary portions 12 and 14 which may, if desired, be provided with contrasting colors, such as, by way of example, red and white. As best illustrated in Fig. 2, sections 12 and 14 are, except for color, substantial duplicates of one another.

Sections 14 and 12 may be suitably secured as along line 16 whereby to provide a hollow bobber having an air chamber denoted generally by the letter A.

A tubular aperture, or bore 18 is provided through the bobber, being defined by a tubular stem-like portion 20 formed integral with portions 12 and 14.

Figure 3:
Fig. 3 is a plan view of a length of fishing line or a leader embodying the teachings of the present invention.

With reference now to Fig. 3, the numeral 30 denotes generally a length of fishing line or leader, and the numerals 32, 34, 36 and 38 denote a plurality or series of tapered abutment members spaced along the line or leader, said abutment members being securely fastened thereto. It will be observed that the size of the abutment members increases in a definite ratio from the smallest, 32, to the largest, 38. These abutment members may be attached to or formed integrally with the line or leader by any suitable means, it being noted that the present invention is neither directed to nor concerned with the particular manner in which the abutments are fabricated. However, it should be noted that the opposite ends of each abutment member should taper whereby to closely approximate the diameter of the line or leader, whereby to facilitate free passage of these abutment members through the conventional line eyelets of a fishing rod, and for enabling the line or leader to be wound upon the drum of a conventional or standard fishing reel. It has been noted that the presence of the abutment members will in no way affect the operating characteristics of fishing reels provided with the so-called "level wind" mechanisms.

Members 40 are pivotally secured to the outer ends of the float such as my means of a set screw 42, the shank of which passes through axial hole 44 of member 40 and threadably engages portions of the bobber for rotatably mounting members 40 relative to the opposite ends of the bobber.

Figure 5:
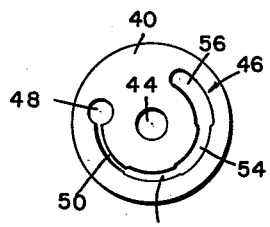
Figs. 5 and 6 are end views of two different types of aperture control plates which comprise a detail of the invention.
Figure 6:
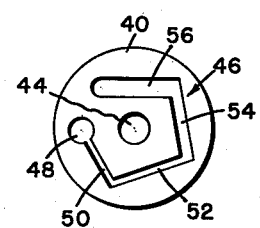
Figure 7:
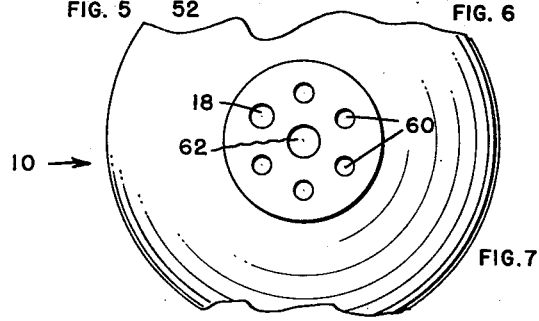
Fig. 7 is an end view of the bobber housing per se.

With reference now to Figs. 5 and 6, the numeral 46 denotes generally an elongated aperture, the width of which varies in a series of steps throughout its length. Preferably one end of the elongated aperture terminates and is in open communication with aperture 48, the diameter of which is preferably of a dimension equal to or somewhat greater than the diameter of axial bore 18.

In the preferred embodiment of the invention the width of the elongated aperture varies throughout its length in a plurality of step portions or sub-apertures indicated respectively by the numerals 50, 52, 54 and 56, wherein the widths of said portions increase in regular increments, as illustrated.

Figure 4:
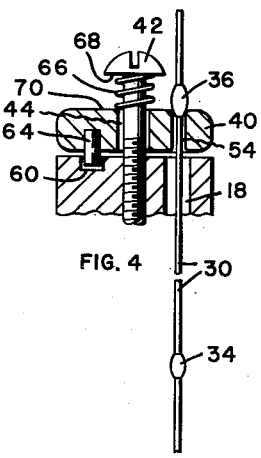
Fig. 4 is an enlarged view of an end of the device of Fig. 2 showing associated therewith the line of Fig. 3.

With reference now to Figs. 2 and 4, it will be noted that members 40 may be rotated for the purpose of disposing various portions of elongated aperture 46 in axial alignment with axial bore 18 of the bobber.

If desired, suitable means such as, by way of example, detents 60, may be provided in circumferential relationship with the center 62 of the ends of the bobber, said detents constructed and arranged to receive the free lower end of a detent pin 64 secured to and projecting outwardly from the bobber-adjacent face of members 40.

A spring 66 may be interposed between the under surface 68 of the head of set screw 42 and the outer face 70 of member 40 whereby member 40 will be normally and yieldably urged toward the adjacent end of the bobber.

As best illustrated in Figs. 2 and 4, the purpose of detent pin 64 is to secure member 40 in predetermined relationship with reference to the bobber and for securing it against accidental or unintentional rotary movement which would tend to effect disalignment of portions of elongated aperture 46 with axial bore 18 of the bobber.

The outside diameter of the largest of the abutment members 38 is of such a dimension as to freely pass through axial bore 18 and through aperture 48 of members 40.

The width or lateral spacing of side walls of portion 50 of the elongated aperture 46 is of a dimension less than the maximum diameter of abutment member 32 whereby to preclude passage of abutment member 32 between portions 50 of the elongated aperture when member 40 has been turned to dispose portions 50 in alignment with axial bore 18.

Similarly the respective widths of portions 52, 54 and 56 of elongated aperture 46 are of a lesser dimension than abutment members 34, 36 and 38, respectively.

With reference again to Fig. 4, it will be noted that member 40 has been disposed whereby to locate portions 54 of elongated aperture 46 in alignment with axial bore 18, whereby to freely permit the passage of abutment members 32 and 34 therethrough, but to preclude passage of abutment 36 therethrough. In this manner I have provided simple yet highly effective means for enabling a fisherman to accurately preselect his hook depth to any one of several predetermined depths simply by rotating member 40 whereby to provide the proper aperture width in alignment with axial bore 18. By tapering the front and rear ends of the various abutment members, those having a smaller diameter than the selected aperture width will pass therethrough with the greatest of ease.

It should be understood that various changes and modifications may be made within the structural details of the device, within the scope of the appended claims, without departing from the spirit of the invention.

What is claimed is:

1. In a fishing bobber, the combination of a float having a tubular aperture therethrough, a member having an elongated aperture therethrough with one end of said aperture terminating in an opening the diameter of which is substantially equal to the diameter of said tubular aperture through said float, the width of said elongated aperture varying throughout its length in a plurality of step portions, and means for securing said member to said float for selective disposition of various preselected portions of said elongated aperture in axial alignment with the tubular aperture of said float.

2. A hollow fishing bobber having a tubular aperture therethrough the ends of which terminate in opposite ends of said bobber, duplicate members each having an elongated aperture the overall length of which is subdivided into a plurality of lesser lengths of varying widths, and means for rotatably mounting said members at opposite ends of said bobber with portions of their respective elongated apertures in axial alignment with an adjacent end of said tubular aperture.

3. A hollow fishing bobber having a tubular aperture therethrough, a member having an elongated aperture therethrough having an overall length which is subdivided into a plurality of end-to-end sub-apertures of varying widths, and means for rotatably mounting said member on said bobber for selectively positioning said sub-apertures in axial alignment with said tubular aperture.

EDWARD L. ALDINGER, Jr.

REFERENCES CITED

The following references are of record in the file of this patent:

UNITED STATES PATENTS

| Number | Name | Date |
|---|---|---|
| 503,722 | Lewis et al. | Aug. 22, 1893 |
| 575,362 | Luther et al. | Jan. 19, 1897 |
| 1,193,684 | Gregory et al. | Aug. 8, 1916 |
| 2,001,241 | De Vries | May 14, 1935 |
| 2,440,012 | Haver | Apr. 20, 1948 |
| 2,483,788 | Smith | Oct. 4, 1949 |
| 2,514,887 | McDow | July 11, 1950 |